United States Patent Office 3,345,436
Patented Oct. 3, 1967

3,345,436
PROCESS OF MAKING URANIUM MONO-
NITRIDE NUCLEAR FUEL
Richard A. Craig, West Hartford, Conn., assignor to the
United States of America as represented by the United
States Atomic Energy Commission
No Drawing. Filed Oct. 11, 1962, Ser. No. 230,016
5 Claims. (Cl. 264—.5)

This invention relates to a process of preparing uranium mononitride.

Uranium nitride is particularly well suitable as nuclear fuel, because it has a high melting point and excellent thermal conductivity, and because it contains the uranium in a high concentration. It also shows very little reaction, or none at all, with most coolants, such as water, air and liquid metals, at operating temperatures. For the uranium nitride to be used as nuclear fuel, it is desiarble that the nitrogen content be close to the stoichiometric amount, or, in other words, that the product be stoichiometric mononitride, because in it the uranium is present in the most concentrated and highly stable form.

Dense stoichiometric uranium mononitride was made heretofore by hot isostatic pressing methods; however, these processes were comparatively time-consuming and expensive and therefore uneconomical.

Attempts have also been made to sinter a precompacted uranium nitride powder in vacuum or in an inert atmosphere to produce nuclear fuel elements. However, this process was not successful, because the uranium nitride decomposed at the high temperatures that were necessary for sintering and densification, so that uranium metal formed and a two-phase system was obtained. It was then tried to sinter the uranium nitride in an atmosphere of nitrogen. However, also this method had its drawbacks; the uranium nitride reacted with the nitrogen of the atmosphere and formed higher uranium nitrides which are undesirable on account of the lesser uranium concentration and also because the pellets fractured.

It is an object of this invention to provide a process for preparing uranium nitride that has the stoichiometric composition of the mononitride, consists of one phase and does not contain any free uranium.

It is another object of this invention to provide a process for preparing uranium mononitride that contains no, or negligible amounts of, higher nitrides.

It is finally also an object of this invention to provide a process for preparing uranium mononitride and fuel materials based thereon that are characterized by a high density and good thermal conductivity.

It has been found that if the sintering of uranium nitride is carried out in at least two steps, the first step at a relatively low temperature and under vacuum and the second and any additional steps at higher temperature in a nitrogen atmosphere, neither a nitride decomposition nor formation of higher nitrides takes place, so that a practically pure uranium mononitride is obtained.

The process of this invention is based on this finding. It comprises compacting uranium mononitride powder into the shape desired of the fuel bodies; presintering the bodies obtained in vacuum at a temperature of between 1260 and 1550° C.; introducing a nitrogen atmosphere and raising the temperature to at least 2050° C., said nitrogen being present in a quantity to yield a pressure above the dissociation pressure of uranium nitride at ambient temperature whereby further sintering and densification take place; cooling the sintered bodies to below 1550° C. while maintaining the nitrogen atmosphere; and finally cooling the sintered bodies to room temperature under vacuum.

For the studies leading to this invention uranium powder was prepared by cutting uranium metals into strips, cleaning the strips, as is known in the art, either by immersion in a sulfuric acid-nitric acid solution or by electrolytical treatment followed by washing with acetone. The uranium strips were then disintegrated into powder by hydriding with hydrogen and decomposing the hydride formed.

Since a fine particle size of the uranium powder was found to be important to obtain uranium mononitride of the greatest possible density and since a finer uranium particle size was obtained the greater the number was of hydriding-decomposition cycles, the use of several cycles was advantageous. It was found that with three cycles the uranium powder obtained had an average particle size of 5.9 microns and, when used for the process of this invention, led to a uranium mononitride of a density 92% of the theoretical density. On the other hand, six cycles yielded a uranium powder of an average particle size of 2.5 microns, which in turn result in a uranium mononitride of a density of 97% of the theoretical value.

The uranium powder obtained after the last hydride decomposition step was then reacted with purified nitrogen at about 900° C. for several hours, for instance for 16 hours. A nitride higher than the mononitride was formed in this step. This higher nitride was then converted to the mononitride by heating at between 1340 and 1350° C. in a vacuum; the excess nitrogen was removed thereby. This conversion to the mononitride usually took about six hours.

The uranium mononitride powder thus obtained was then treated by the process of this invention. It was first compacted into the shape desired, such as pellets, rods or plates, for instance at 100 t.s.i. in a breakaway die at room temperature; it was then subjected to the presintering step in a vacuum. The temperature for this step ranged between 1260 and 1550° C., as mentioned before. In this step any entrapped and/or absorbed gases were removed.

Thereafter sintering proper was carried out. For this purpose the temperature was raised to above 2050° C., up to about 2500° C., while the vacuum was replaced by a nitrogen atmosphere. However, the temperature was preferably held at below 2260° C. and an optional, third, sintering step was added. This will be described in the next paragraph. As mentioned, the nitrogen pressure should be above the decomposition pressure of the uranium mononitride for the following sintering; a pressure of ⅔ atm. abs. was usually satisfactory. At a temperature between 2050 and 2260° C., a very slow grain growth took place, a desirable feature for a high-density product. This sintering step was usually carried out for about two hours.

In order to reduce the porosity of the product still further and to obtain an additional densification, the optional third sintering step was carried out. For it, the temperature was raised to between 2260 and 2500° C., and held there for about another two hours while still maintaining the nitrogen atmosphere as described above.

The product was then cooled stepwise, first to below 1550° C., but not lower than 1200° C., in a nitrogen atmosphere and then to room temperature in a vacuum.

The uranium mononitride made by the process of this invention has utility especially in nuclear reactors where a minimum core size and a high operating temperature are required.

Uranium mononitride was prepared by the process of this invention, namely by cold-compacting into pellets, vacuum-sintering for two hours at 1540° C., heating for two hours in nitrogen of 10 p.s.i.a. at 2040° C., heating for another two hours in nitrogen at 2260° C., cooling in nitrogen to about 1540° C. and vacuum-cooling to room temperature. The pellets thus obtained were used for 1600 hours in a nuclear reactor operating at about 1100° C. to a burn-up of about $2.2 \times 10^{20}$ Fission/cc. Fuel without unfavorable effect.

It will be understood that the invention is not be be limited to the details given herein but that it may be modified within the scope of the appended claims.

What is claimed is:

1. A process of densifying uranium nitride fuel, consisting in compacting uranium mononitride powder into the shape desired of the fuel bodies; presintering the bodies obtained in vacuum at a temperature of between 1260 and 1550° C.; introducing a nitrogn atmosphere, said nitrogen being present in a quantity to yield a pressure above the dissociation pressure of uranium mononitride at ambient temperature, and then raising the temperature to between 2050° C. and 2500° C., whereby further sintering and densification take place; cooling the sintered bodies to from 1550 to 1200° C. while maintaining the nitrogen atmosphere; and finally cooling the sintered bodies to room temperature, while maintaining a vacuum.

2. The process of claim 1 wherein the nitrogen is maintained at a pressure of approximately ⅔ atm. abs.

3. The process of claim 1 wherein sintering in the nitrogen atmosphere is carried out in two steps, the temperature for the first sintering step being maintained between 2050 and 2260° C. and the temperature for the second sintering step being maintained at from 2260 to 2500° C.

4. A process of making nuclear fuel of great density consisting in producing uranium powder by hydriding uranium metal and decomposing the hydride formed; reacting the uranium powder formed at about 900° C. with pure nitrogen gas whereby a uranium nitride higher than the mononitride is formed; heating the uranium nitride at between 1340 and 1350° C. in vacuum to form uranium mononitride; compacting the uranium mononitride; presintering the uranium mononitride in vacuum at a temperature of between 1260 and 1550° C.; introducing a nitrogen atmosphere, said nitrogen being present in a quantity to yield a pressure above the dissociation pressure of uranium mononitride at ambient temperature and then raising the temperature to at least between 2050 and 2500° C., whereby further sintering and densification take place; cooling the sintered bodies to below from 1550 to 1200° C. while maintaining the nitrogen atmosphere; and cooling the sintered bodies to room temperature while maintaining a vacuum.

5. A process of making nuclear fuel of great density consisting in producing uranium powder by hydriding uranium metal and decomposing the hydride formed; reacting the uranium powder formed at about 900° C. with pure nitrogen gas whereby a uranium nitride higher than the mononitride is formed; heating the uranium nitride at between 1340 and 1350° C. in vacuum to form uranium mononitride; compacting the uranium mononitride; presintering the uranium mononitride in vacuum at a temperature of between 1260 and 1550° C.; introducing a nitrogen atmosphere and then raising the temperature to between 2050 and 2260° C., said nitrogen being at a pressure of about ⅔ of an atmosphere, whereby further sintering and densification take place; heating the mononitride in said nitrogen atmosphere at between 2260 and 2500° C.; cooling the sintered bodies to below 1550° C. while maintaining the nitrogen atmosphere; and cooling the sintered bodies to room temperature while maintaining a vacuum.

References Cited

UNITED STATES PATENTS

| | | | |
|---|---|---|---|
| 2,244,052 | 6/1941 | Comstock | 75—200 |
| 2,544,277 | 3/1951 | Newton et al. | 23—14.5 |

OTHER REFERENCES

AEC Report BMI–1489, December 1960, pp. I–2–I–4.
AEC Report Oro–248, December 1959, pp. 3–6.
AEC Report Oro–254, December 1959, p. 5.
Reactor Core Materials, August 1961, vol. 4 No. 3 p. 14.
Nuclear Science Abstract, No. 19224 (BMI–1365), vol. 13, pp. 2579 and 2580, November 1959.

CARL D. QUARFORTH, *Primary Examiner.*

REUBEN EPSTEIN, *Examiner.*

R. W. MacDONALD, R. L. GRUDZIECKI,
*Assistant Examiners.*